United States Patent
Baldemair et al.

(10) Patent No.: US 11,431,443 B2
(45) Date of Patent: Aug. 30, 2022

(54) HARQ CODEBOOK

(71) Applicant: Telefonaktiebolaget LM Ericsson (publ), Stockholm (SE)

(72) Inventors: Robert Baldemair, Solna (SE); Mattias Andersson, Sundbyberg (SE); Erik Dahlman, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/580,907

(22) Filed: Sep. 24, 2019

(65) Prior Publication Data

US 2020/0021399 A1 Jan. 16, 2020

Related U.S. Application Data

(63) Continuation of application No. 16/401,741, filed on May 2, 2019, now Pat. No. 10,469,206, which is a continuation of application No. PCT/SE2017/050719, filed on Jun. 28, 2017.

(51) Int. Cl.
*H04L 1/16* (2006.01)
*H04L 1/18* (2006.01)
*H04L 5/00* (2006.01)

(52) U.S. Cl.
CPC .......... *H04L 1/1671* (2013.01); *H04L 1/1607* (2013.01); *H04L 1/1819* (2013.01); *H04L 1/1858* (2013.01); *H04L 1/1861* (2013.01); *H04L 5/0055* (2013.01); *H04L 5/001* (2013.01)

(58) Field of Classification Search
CPC .... H04L 1/1671; H04L 1/1607; H04L 1/1861
See application file for complete search history.

(56) References Cited

U.S. PATENT DOCUMENTS

| | | | | |
|---|---|---|---|---|
| 5,444,718 A | * | 8/1995 | Ejzak | .................... H04L 1/1614 714/748 |
| 6,367,045 B1 | * | 4/2002 | Khan | ....................... H04L 1/16 714/748 |

(Continued)

FOREIGN PATENT DOCUMENTS

| | | |
|---|---|---|
| JP | 201711723 A | 1/2017 |
| KR | 20120063551 A | 6/2012 |

(Continued)

OTHER PUBLICATIONS

International Search Report and Written Opinion dated Jan. 4, 2018 for International Application No. PCT/SE2017/050719 filed on Jun. 28, 2017, consisting of 12-pages.

(Continued)

*Primary Examiner* — Joseph D Torres
(74) *Attorney, Agent, or Firm* — Christopher & Weisberg, P.A.

(57) ABSTRACT

A method of operating a user equipment in a radio access network is disclosed. The method includes transmitting acknowledgment signaling based on a codebook, the codebook associating a bit pattern having comprising one or more subpatterns with the acknowledgment signaling. Each subpattern representing acknowledgment information according to a reporting type, in which the codebook groups subpatterns based on their reporting type.

8 Claims, 3 Drawing Sheets

(56) References Cited

U.S. PATENT DOCUMENTS

| | | | |
|---|---|---|---|
| 6,557,135 B1* | 4/2003 | Balachandran | H04L 1/1614 714/748 |
| 6,643,813 B1* | 11/2003 | Johansson | H04L 1/1685 714/748 |
| 6,778,501 B1 | 8/2004 | Malmgren et al. | |
| 7,000,021 B1* | 2/2006 | Radhakrishnan | H04L 1/1614 370/394 |
| 7,525,908 B2 | 4/2009 | Olsson | H04L 1/0083 370/229 |
| 7,631,240 B2* | 12/2009 | Frederiks | H04L 1/1614 714/748 |
| 7,650,559 B2 | 1/2010 | Nishibayashi et al. | |
| 2003/0135640 A1* | 7/2003 | Ho | H04L 1/1621 709/237 |
| 2006/0034274 A1* | 2/2006 | Kakani | H04L 1/1825 370/389 |
| 2007/0115896 A1* | 5/2007 | To | H04W 72/10 370/338 |
| 2010/0011273 A1* | 1/2010 | Parolari | H04L 1/1614 714/749 |
| 2010/0074120 A1 | 3/2010 | Bergman et al. | |
| 2011/0116530 A1 | 5/2011 | Sambhwani | |
| 2013/0034029 A1 | 2/2013 | Lee | |
| 2014/0044028 A1 | 2/2014 | Nammi et al. | |
| 2014/0119284 A1 | 5/2014 | Baldemair et al. | |
| 2015/0110016 A1 | 4/2015 | Kim et al. | |
| 2015/0131494 A1 | 5/2015 | He et al. | |
| 2015/0256298 A1 | 9/2015 | Nammi et al. | |
| 2016/0165592 A1 | 6/2016 | Han et al. | |
| 2016/0182205 A1* | 6/2016 | Asterjadhi | H04L 1/1685 370/329 |
| 2017/0111951 A1* | 4/2017 | Chu | H04L 1/1671 |

FOREIGN PATENT DOCUMENTS

| | | |
|---|---|---|
| KR | 20140069337 A | 6/2014 |
| WO | 2012099516 A1 | 7/2012 |
| WO | 2013169167 A1 | 11/2013 |
| WO | 2014022861 A1 | 2/2014 |
| WO | 2016148812 A1 | 9/2016 |
| WO | 2017028001 A1 | 2/2017 |

OTHER PUBLICATIONS

3GPP TSG RAN WG1 Meeting NR Ad-Hoc#2 R1-1710333; Title: Support of HARQ-ACK multiplexing/bundling for NR; Agenda Item: 5.1.3.3.5.2; Source: LG Electronics; Document for: Discussion and decision; Location and Date:Qingdao, P.R. China, Jun. 27-30, 2017, consisting of 7-pages.

3GPP TSG RAN WG1 Meeting NR Ad-Hoc#2 R1-1711259; Title: Discussion on CBG-based HARQ feedback multiplexing; Agenda Item: 5.1.3.3.5.2; Source: HTC; Document for: Discussion and Decision; Location and Date: Qingdao, P.R. China, Jun. 27-30, 2017, consisting of 3-pages.

3GPP TSG-RAN WG1 Meeting NR Ad-Hoc#2 R1-1711510; Title: On HARQ Codebook; Agenda Item: 5.1.3.3.5.2; Source: Ericsson; Document for: Discussion, Decision; Location and Date:Qingdao, China, Jun. 27-30, 2017, consisting of 3-pages.

Korean Notice of Allowance and English Translation dated Feb. 12, 2020 for Application No. 20197032743, consisting of 5-pages.

Moroccan Written Opinion and Preliminary Search Report and English Translation dated May 27, 2020, consisting of 9 pages.

Indian Office Action dated Mar. 30, 2021 for Patent Application No. 201917053486, consisting of 6-pages.

Chinese Office Action and English Translation Summary dated Oct. 11, 2021 for Application No. 201780092587.5, consisting of 13 pages.

3GPP TS 25.331 V7.25.0; 3rd Generation Partnership Project;Technical Specification Group Radio Access Network; Radio Resource Control (RRC); Protocol Specification (Release 7); Jun. 2014, consisting of 1491 pages.

"Chapter 6 Basic Signaling Process" http://www.360doc.com/content/12/0229/17/7299856_190604885.shtml; Feb. 29, 2012, consisting of 22 pages.

* cited by examiner

HARQ CODEBOOK

CROSS-REFERENCE TO RELATED APPLICATION

This application is a continuation of U.S. application Ser. No. 16/401,741 filed on May 2, 2019, which is a continuation of International Application No. PCT/SE2017/050719, filed Jun. 28, 2017, the entireties of which are incorporated herein by reference.

TECHNICAL FIELD

This disclosure pertains to the field of wireless communication technology, in particular in the context of a radio access network (RAN) like NR.

BACKGROUND

Acknowledgement signaling processes like HARQ or ARQ are widely used in wireless communication technology (telecommunications) to facilitate low error rates when transferring data. With the introduction of more flexibility into communication systems, handling acknowledgement signaling becomes more complex, in particular with the capability of utilizing different reporting types for acknowledgement signaling and increasing number of signaling processes to consider.

SUMMARY

It is an object of this disclosure to provide approaches improving handling of acknowledgment signaling. The approaches may in particular enable reliable and predictable handling of acknowledgement signaling, respectively corresponding signaling structures. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution.

Accordingly, there is disclosed a method of operating a user equipment (UE) in a radio access network. The method comprises transmitting acknowledgment signaling based on a codebook, the codebook associating a bit pattern comprising one or more subpatterns with the acknowledgment signaling, wherein each subpattern represents acknowledgment information according to a reporting type, wherein the codebook groups subpatterns based on their reporting type. Alternatively, or additionally, the method may comprise transmitting acknowledgement signaling based on one or more group size indications.

There is also disclosed a user equipment for a radio access network. The user equipment is adapted for transmitting acknowledgment signaling based on a codebook, the codebook associating a bit pattern comprising one or more subpatterns with the acknowledgment signaling, wherein each subpattern represents acknowledgment information according to a reporting type, wherein the codebook groups subpatterns based on their reporting type. Alternatively, or additionally, the user equipment may be adapted for transmitting acknowledgement signaling based on one or more group size indications. The user equipment may comprise, and/or be adapted for utilizing, processing circuitry and/or radio circuitry, in particular a transceiver and/or transmitter and/or receiver, for the transmitting, and/or for determining and/or receiving the codebook, e.g. for being configured with the codebook. Alternatively, or additionally, the UE may comprise a corresponding transmitting module and/or determining module and/or receiving module for such transmitting and/or determining and/or receiving, respectively.

Generally, transmitting the acknowledgement signaling may be based on a codebook and/or based the one or more group size indications.

Moreover, a method of operating a configuring radio node in a radio access network may be considered. The method comprises configuring a user equipment with a codebook for acknowledgment signaling, the codebook associating a bit pattern comprising one or more subpatterns with the acknowledgment signaling, wherein each subpattern represents acknowledgment information according to a reporting type, wherein the codebook groups subpatterns based on their reporting type. Alternatively, or additionally, the method may comprise configuring a user equipment with one or more group size indications for acknowledgement signaling.

A configuring radio node for a radio access network is also proposed. The configuring radio node is adapted for configuring a user equipment with a codebook for acknowledgment signaling. The codebook associates a bit pattern comprising one or more subpatterns with the acknowledgment signaling, wherein each subpattern represents acknowledgment information according to a reporting type, wherein the codebook groups subpatterns based on their same reporting type. Alternatively, or additionally, the configuring radio node may be adapted for configuring a user equipment with one or more group size indications for acknowledgement signaling. The configuring radio node may comprise, and/or be adapted for utilizing, processing circuitry and/or radio circuitry, in particular a transceiver and/or transmitter and/or receiver, for the configuring (e.g., the corresponding transmitting), and/or or for determining the codebook and/or the one or more group size indications. Alternatively, or additionally, the configuring radio node may comprise a corresponding configuring or transmitting module and/or a determining module for such transmitting and/or determining, respectively.

Furthermore, a method of operating a receiving radio node in a radio access network is disclosed. The method comprises receiving acknowledgement signaling based on a codebook, the codebook associating a bit pattern comprising one or more subpatterns with the acknowledgment signaling, wherein each subpattern represents acknowledgment information according to a reporting type, wherein the codebook groups subpatterns based on their reporting type. The method may be implemented in addition to a method of operating a configuring radio node (in which case the receiving radio node may be also be implemented as configuring radio node), or independent thereof.

A receiving radio node for a radio access network may be considered. The receiving radio node is adapted for receiving acknowledgement signaling based on a codebook, the codebook associating a bit pattern comprising one or more subpatterns with the acknowledgment signaling, wherein each subpattern represents acknowledgment information according to a reporting type, wherein the codebook groups subpatterns based on their reporting type. The receiving radio node may comprise, and/or be adapted for utilizing, processing circuitry and/or radio circuitry, in particular a transceiver and/or receiver and/or transmitter, for the receiving, and/or or for determining the codebook, e.g. based on a configuration and/or control signaling received, which may comprise a codebook indication, which for example may identify structure and/or size of the codebook, respectively of the groupings. Alternatively, or additionally, the receiving radio node may comprise a corresponding receiving module and/or a determining module for such receiving and/or determining, respectively. The receiving radio node may be implemented as configuring radio node, or independent thereof.

Receiving acknowledgment signaling based on a codebook may comprise decoding and/or demodulating and/or interpreting and/or identifying and/or associated signaling with acknowledgment signaling according to the codebook. In particular, it may be assumed that the acknowledgement signaling (and/or the acknowledgment information represented by the signaling) follows and/or complies with the bit pattern indicated by the codebook.

A receiving radio node and/or configuring radio node may in particular be implemented as network node. However, in some case, such node/s may be implemented as user equipment, e.g. in sidelink scenarios.

A codebook may be considered to associate to acknowledgement signaling a bit pattern, e.g. by define and/or indicating, the bit pattern to be used for acknowledgment signaling. A bit pattern may be considered to be associated to acknowledgment signaling for example if the acknowledgement information to be signaled with the signaling is provided and/or indicated and/or represented in the bit pattern. A codebook may generally define and/or indicate the size and/or structure of the bit pattern. The structure of a bit pattern may be considered to indicate which bits or subpatterns are arranged where in the pattern, and/or map subpatterns to acknowledgement signaling processes and/or component carriers. In addition, the codebook may indicate which subpatterns form a group (are grouped together), e.g. based on reporting type, in particular size.

The approaches disclosed herein facilitate reliable and predictable handling of acknowledgment signaling, and in particular may facilitate coherent understanding of acknowledgment signaling structures and sizes between a UE and a radio node like a network node. Also, grouping subpatterns according to reporting type allows easier handling, error detection, padding (e.g., for missed scheduling assignments), in particular in the context of configuring group indications.

The size of a bit pattern or subpattern may indicate the number of bits in the bit pattern or subpattern. Generally, a subpattern may be considered a part of the bit pattern, representing a (smaller) pattern of bits.

A reporting type may generally determine and/or define a structure and/or size of a subpattern, and/or of the acknowledgement information represented and/or to be represented thereby. The structure of a subpattern may be considered to indicate which bit/s of the subpattern is/are arranged where in the subpattern, and/or map bit/s of the subpattern to a data block or data blocks for which acknowledgement information represented by the bit/s pertains, and/or indicate its size (in bits).

A data block may generally be a block of data and/or bits which may be subject to an acknowledgement signaling process. A data block may comprise one or more subblocks, which may be grouped into one or more subblock groups, e.g. code block groups. A data block may in particular be a transport block, which may comprise one or more code blocks and/or one or more code block groups. A subblock group like a code block group may comprise one or more subblocks, e.g. code blocks. It may be considered that a data block comprises one or more subblock groups, which may have the same or different sizes (e.g., in number of bits, e.g. systemic and/or coding bits). It may be considered that a data block comprises systemic bits (which may be considered to represent data to be transmitted) and/or coding bits, e.g. bits for error coding like error detection and/or error correction coding, and/or parity or CRC (Cyclic Redundancy Check) bits. A subblock and/or subblock group may analogously comprise systemic and/or coding bits.

An acknowledgment signaling process may be a HARQ process, and/or be identified by a process identifier, e.g. a HARQ process identifier or subidentifier. The codebook may in particular be a HARQ codebook.

Acknowledgment information may generally indicate at least ACK or NACK, e.g. pertaining to an acknowledgment signaling process, or an element of a data block structure like a data block, subblock group or subblock. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. Accordingly, the associated subpattern may comprise one or more bits indicating reception status or feedback of the data block, and/or one or more bits indicating reception status or feedback of one or more subblocks or subblock groups. Each bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subpattern may pertain to one acknowledgement signaling process and/or one component carrier. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes on a one-to-one basis. In some variants, there may be multiple subpatterns (and/or associated acknowledgment signaling processes) associated to the same component carrier, e.g. if multiple data streams transmitted on the carrier are subject to acknowledgement signaling processes.

A subpattern may comprises one or more bits. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

A reporting type may generally define the structure of the associated subpattern and/or the size of the associated subpattern and/or to which data block structure (e.g. element/s thereof and/or resolution) the subpattern pertains. Grouping based on reporting type may generally be based on one or more parameters of reporting types, in particular the subpattern size (in bit). Generally, different reporting types may differ in at least one characteristic like size or mapping of bits to data block structures. In some variants, a reporting type may be represented by, and/or be characterized by, one characteristic, in particular size of the subpattern of the reporting type.

It may be considered that at least two subpatterns are of different reporting type, in particular of different size.

The codebook may be configured or configurable. Configuring the codebook may comprise transmitting a plurality of messages and/or the codebook may be configured based on one or more indications, which may be configured and/or determined separately. For example, configuring may comprise transmitting one or more scheduling assignments, each or some of which may provide an indication for codebook configuration, e.g. indicate e.g. a reporting type associated to feedback (acknowledgment information), which may be scheduled in response to a scheduled data transmission, e.g. of one or more data blocks. The scheduling assignment may schedule/configure for the UE the feedback and/or the scheduled data transmission. A scheduling assignment may alternatively or additionally indicate a total number of subpatterns of the same reporting type or size to be included in the codebook, or a corresponding total number of bits for such subpatterns. Such a total number may for example be represented by a total DAI (Downlink Assignment Indicator), which may be included in each scheduling assignment transmitted. A total DAI or total number may pertain to a specific reporting type, such that in cases of different reporting types being included in the codebook, different total DAI may be provided for associated scheduling assignments. A total DAI may be seen as an example of a group indication. Configuring the codebook may alternatively, or additionally, comprise configuring the UE with one or more group indications, e.g. total DAI. Such group indications may be provided in a scheduling grant. In particular, a total DAI may be provided in each scheduling assignment, wherein the total DAI may pertain to the reporting type indicated for feedback pertaining to the scheduling assignment it is contained in. In addition, the total DAIs for each reporting type may be provided in a different message like a scheduling grant.

A structure of a subpattern may generally represent a mapping of bits representing acknowledgment information to a data block and/or one or more subblock groups and/or subblocks of a data block structure. The mapping may represent a resolution of the acknowledgment information.

In general, grouping the subpatterns may comprise associating each subpattern of the bit pattern to a group, e.g. such that each subpattern is associated to a single group. A group may comprise one or more subpatterns, e.g. based on scheduled or configured feedback. Grouping may comprise grouping the subpatterns according to size, which may be indicated by, and/or representative of, the reporting type. Such grouping may be such that in the bit pattern, subpatterns are arranged according to increasing (or decreasing) size, e.g. such that size increases from a start of the pattern to the end, e.g. from left to right, depending on representation of the bit pattern. The size of a group of subpatterns may be based on, and/or correspond to, the sum of sizes of the subpatterns in the group, and/or the number of subpatterns in the group. Generally, subpatterns of the same size and/or reporting type may be grouped together into a subpattern group, such that different groups may comprise subpatterns associated to different reporting types, in particular sizes. The grouping may be logical (e.g., for mapping and/or decoding and/or demodulating the acknowledgement signaling), and/or physical, e.g. considering resources used for transmitting the acknowledgment signaling. For subpatterns which are indicated in the codebook, but for which no scheduling assignment was received, and/or no acknowledgment information may be provided, a failure indication may be provided, e.g. a pre-defined pattern of bits, which may for example indicate DTX or DRX. Such a failure indication may have a size in bits corresponding to the size of the subpatterns in the group. A group may be represented by a pattern of bits associated to the subpatterns of the group, which may be arranged, e.g. based on the associated acknowledgment signaling processes, in particular associated process identifiers, which may in particular be represented by a set of sortable identifiers, which may be represented by numbers or bit sequences. For example, within a group, subpatterns may be sorted according to process number, e.g. the lowest number first, or the lowest number last, or according to another scheme. It should be noted that processes with neighboring numbers may have different reporting types and/or may be associated to different groups. A bit pattern may comprise a sequence of groups, which may be for example arranged in the pattern according to reporting type and/or size of the subpatterns of a group. In some cases, the groups may be arranged based on the group size, e.g. such that the largest group comes first (e.g., logically or in a suitable bit pattern representation, and/or physically).

A group size indication may generally indicate the size of a group of subpatterns, e.g. by indicating the number of subpatterns (which may be combined with a number of bits for a corresponding subpattern or reporting type, which may be provided with the same message as part of the group size indication, or be determined or configured separately) and/or the total number of bits in the group. A group size indication may for example be a total DAI. For each reporting type or group for a codebook, a group size indication may be transmitted, and/or the codebook may be configured based thereon.

Transmitting acknowledgment signaling may comprise transmitting a codebook indication. A codebook indication may indicate size and/or structure of the codebook used, e.g. arrangement and/or number and/or size of groups, and/or size of the bit pattern. The codebook indication may be transmitted with the acknowledgment signaling, or separate thereof, e.g. being modulated independently of the acknowledgment signaling, and/or being transmitted at a separate time/frequency resource. Receiving the acknowledgement signaling may be based on such a codebook indication, which may be used for decoding and/or demodulating and/or mapping the acknowledgment signaling. The acknowledgement signaling may be transmitted on a control channel, e.g. a physical control channel like a PUCCH (Physical Uplink Control Channel) or PSCCH (Physical Sidelink Control Channel). Alternatively, the acknowledgment signaling may be transmitted on, and/or multiplexed with, a data channel or a shared channel, in particular a physical channel like a PUSCH (Physical Uplink Shared Channel) or a PSSCH (Physical Sidelink Shared Channel). Multiplexing in this context may comprise rate matching or puncturing. The channel and/or multiplexing may be configured or configurable, e.g. based on control signaling (e.g., utilizing a scheduling grant) or higher layer signaling.

It should be noted that acknowledgement information may be encoded and/or modulated and/or mapped to symbols for transmission as acknowledgement signaling, respectively that such signaling may be decoded and/or demodulated to retrieve the acknowledgment information. Transmitting and/or receiving may comprise such en- or decoding and/or modulating or demodulating.

There is also disclosed a program product comprising instructions causing processing circuitry to control and/or perform any one of the methods described herein.

Moreover, a carrier medium arrangement carrying and/or storing a program product as disclosed herein may be considered.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
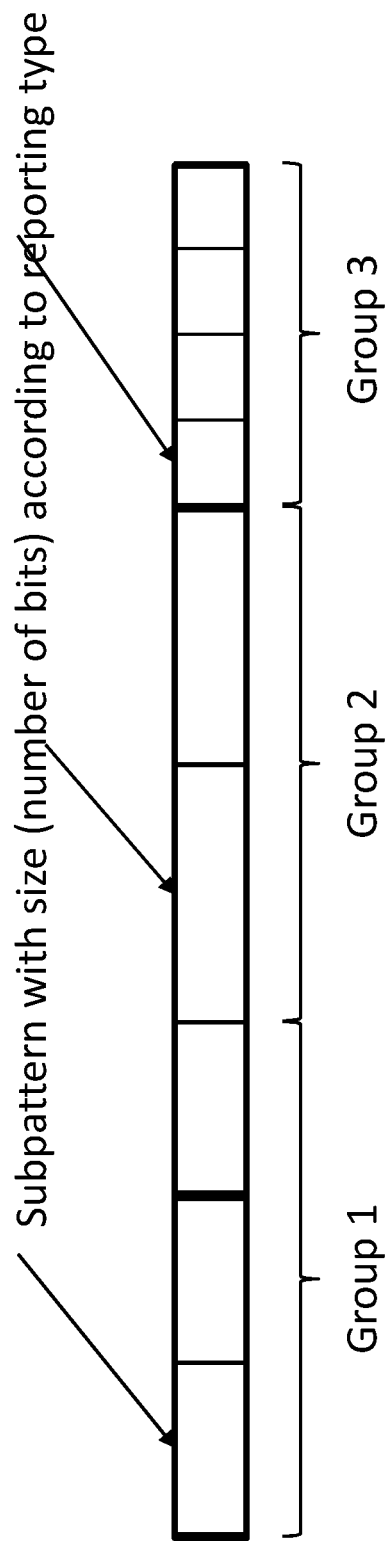
FIG. 1, showing an exemplary bit pattern of a codebook.

FIG. 1 schematically shows a bit pattern according to an exemplary code book. The start of the bit pattern (e.g., bit 0) may be arranged at the left, the end (e.g., bit E) at the right, however, other representations may be used. The bit pattern is formed of three groups, although a different number of groups may be used. In the example, group 1 comprises 2 subpatterns, group 2 comprises 3 subpatterns, and group 3 comprises 4 subpatterns. Different numbers of subpatterns per group may be used, depending e.g. on scheduled feedback or configured codebook. In particular, the number of subpatterns per group may be arbitrary, and do not have to be in a monotonous increasing (or decreasing) distribution. Each subpattern in a group has the same size and/or reporting type, whereas the subpattern size and/or reporting types between groups are different. In the example, the subpattern sizes may be considered to increase from right to left, as indicated by the size of boxes representing the subpatterns. Other grouping based on size may be considered, e.g. reversing the order, such that the smallest subpattern size comes first, or according to group sizes, e.g. in decreasing or increasing order. The number E may represent the total number of bits in the bit pattern, based on the sum of the bits of the subpatterns.

Figure 2:
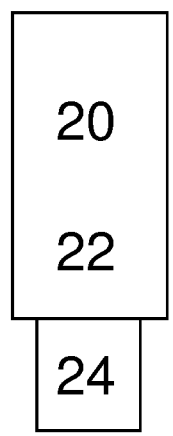
FIG. 2, showing an exemplary radio node, implemented as user equipment.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
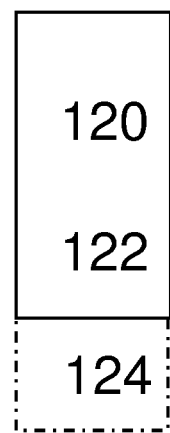
FIG. 3, showing an exemplary radio node, implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein.

Transmission of data, and/or transmission on a data channel, may in particular be transmission of user data or transmission on the user plane. By multiplexing control information on such transmission, the user plane transmission may be considered to by hybridized for the control plane. Data information may be information transmitted on the data channel, and/or be represented by data bits. Bits for transmission, e.g. data bits of control information bits (representing control information) may comprise systemic information or systemic bits, which may represent the information or bits to be transmitted, and optionally coding bits, e.g. for error coding (in particular, error detection coding and/or forward error correction coding). The coding bits may be used for decoding and/or demodulating the systemic bits correctly, e.g. in the context of an acknowledgment signaling process. The content of the systemic bits may be transparent or irrelevant for the approaches described herein.

An acknowledgement signaling process and/or associated signaling and/or coding bits may be implemented pertaining to a radio layer, in particular a physical layer, or in some cases a MAC (Medium Access Control) layer.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilizing an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink communication or similar thereto.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/ allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/ or a HARQ-specific channel. Multiple channels may apply for multi-component/multi-carrier indication or signaling.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/ or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/ width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1.

A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g., a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

Puncturing and rate-matching are discussed in the context of NR pertaining to downlink data transmission. UCI may be replaced generally with control information, in particular acknowledgment information of feedback information, and PUSCH may be replaced with data/shared channel, e.g. in uplink or sidelink. Instead of a network or network node, a radio node or (second) UE may provide sidelink control signaling and/or data in response to which the control information is to be provided by puncturing or rate-matching. In puncturing, data is encoded and mapped (e.g., as symbol/after modulation) by the UE to the allocated data resource elements like PUSCH resource elements (without considering UCI or control signaling to be transmitted). Thereafter, UCI modulation symbols or UCI information (or, more generally, control information like feedback information or acknowledgment information, or corresponding symbols) is mapped to resource elements that should carry the control information/UCI instead, replacing the data or related symbols, which may thus be discarded. This process is called puncturing. Puncturing will impact the performance of data reception, but as long as the number of data bits that are punctured (and "stolen" for UCI) is reasonable, the data performance degradation is modest.

An advantage of puncturing is that a receiver (e.g., gNB, network) does not need to be aware if control information (e.g., UCI) is inserted or not; even if network assumes the UE to include the control information but it does not, the network can decode the data channel/PUSCH data anyway. Inconsistency between the UE and network regarding presence of the control information or its size can occur, e.g. due to missed (DL or SL) scheduling assignment/s. In such a case, the network expects the UE to transmit an acknowledgement relating to a downlink data transmission indicated by the scheduling assignment, but since the UE did not receive the scheduling assignment, it will not include the expected HARQ feedback.

A drawback of puncturing is the performance loss it induces on PUSCH data. In puncturing, the coded bits of data for PUSCH (e.g., systemic and coding bits together, wherein the coding bits may be determined based on the systemic bits) mapped onto resource elements supposed to carry UCI are deleted, irrespective of the importance of the coded bits. Especially for large UCI sizes and high MCS, PUSCH data performance loss can be large. Performance losses of 1 dB or more can be observed for higher MCS (modulation and coding scheme) levels.

Rate matching adjusts the set of coded bits representing the data to "make room" for the UCI. This avoids for example that systematic bits—which are typically more important than parity bits (which are an example of coding bits)—are not transmitted. Rate matching requires the UE and network to have a coherent (unambiguous) understanding of whether UCI is present or not, and of the size of it, otherwise the network may not be able to decode the information (e.g., data and/or control information) transmitted in uplink.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilizing resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a frequency resource range may represent a non-continuous pattern of resources. A signaling resource structure may be implemented analogously. The resource elements of a substructure may be scheduled for associated signaling. A feedback resource range may, e.g. on one or more resource elements thereof, comprise and/or be associated to feedback signaling, e.g. measurement reporting signaling and/or acknowledgement signaling. In some variants, it may comprise and/or be associated to additional signaling, e.g. control signaling and/or data signaling like user data signaling, e.g. on PUSCH. Different signalings in a feedback resource range may be distributed according to a pattern, which may be configured or configurable, e.g. with a scheduling grant or other control signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

An acknowledgement signaling process may be a process of transmitting and/or retransmitting data (e.g., in the form of data elements), based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) and/or a DRX (Discontinuous Reception) indication.

It should be noted that there may be DTX/DRX on either side of a communication. The radio node determining and/or transmitting the acknowledgement signaling may not receive an expected data element, and indicate this in the acknowledgement signaling as DTX, allowing more finely grained acknowledgment information. On the other hand, the radio node receiving acknowledgment signaling may not receive an expected acknowledgement signal, and treat this as a DTX event. Both kinds of DTX may be treated separately, e.g. as DTX1 and DTX2 or according to a different scheme. A data element in the context of acknowledgement signaling may in particular represent a data block like a transport block or code block, which may be subject to an acknowledgement signaling process, and one or more transmissions in the context of such a process. An acknowledgement signaling process may have associated thereto a process identifier, e.g. a process number like a HARQ process number or identifier or an ARQ process number or identifier. Acknowledgement information associated to an acknowledgement signaling process may comprise a number of bits or a bit pattern, e.g. comprising 1 or 2 bits. The bit setting may represent ACK or NACK (e.g., 1 or 0, or 11 or 00), or in some variants include DRX/DTX or similar. An acknowledgment signaling process may be associated to a data stream and/or channel or data block, and/or to a transmission in the context of a data stream and/or channel, or transmission of a data element or data block. A buffer or memory may be associated to an acknowledgement signaling process. An acknowledgement signaling process, for example a HARQ process, may comprise soft-combining and/or forward error correction and/or error detection schemes.

An acknowledgement signaling process may be associated to a reporting type. A reporting type may define and/or indicate whether the process, and/or acknowledgement information (or signaling) associated or pertaining to the process, pertain/s to a data element, e.g. to a transport block or data block, or to a plurality of subelements thereof, e.g. code blocks or groups thereof, which may be part of a (in particular, the same) transport block. Alternatively, or additionally, a reporting type may define and/or indicate how to map a bit pattern of one or more bits of the information and/or signaling. An exemplary reporting type, which may be considered to pertain to a data element or transport block, may indicate that the process or information/signaling pertains to the data element as a whole, e.g. based on error decoding performed on the data element. Another exemplary reporting type may define or indicate that the process and/or information/signaling pertains to a plurality of subelements or groups thereof, for which for example separate decoding/error decoding processes may be performed, respectively results thereof may be indicated.

A bit pattern (one or more bits) of acknowledgement information and/or associated signaling may indicate correct or incorrect reception (and/or, whether retransmission is requested/required or not) of a data element as a whole, e.g. for a reporting type pertaining to the data element as a whole. Whether a data element has been received correctly or not may be determined based on error decoding of its subelements. For example, a data element may be indicated to be received correctly if all its subelements have been received correctly. A bit pattern alternatively (or in some cases, additionally) may indicate correct or incorrect reception (and/or, whether retransmission is requested/required or not) of subelements like code blocks individually (or in groups). For example, a bit pattern of associated signaling may indicate correct or incorrect reception (and/or, whether retransmission is requested/required or not) for one or more, in particular for each, code block (or code block group) of a data element. Different acknowledgement signaling processes (in particular, HARQ processes) may have different reporting types. The mapping of a bit pattern may indicate or define which bit/s pertain to which data element or subelement.

A code block may be considered a subelement of a data element like a transport block, e.g., a transport block may comprise a one or a plurality of code blocks.

Transmission associated to an acknowledgement signaling process, and/or the associated resources or resource structure, may be configured and/or scheduled, for example by a scheduling assignment. A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Different scheduling assignments may be associated to different acknowledgement signaling processes. A scheduling assignment may indicate a reporting type of associated feedback signaling. It may generally be considered that one or more scheduling assignments are transmitted separately from a format indication, e.g. in one or more different messages, or to be separated in time and/or frequency by at least one symbol time interval and/or subcarrier. In some variants, a message may comprise more than one scheduling assignment. It may be considered in some examples that a scheduling grant is transmitted together with one or more scheduling assignments, e.g. in the same message and/or according to an associated message or signaling format. As such grants may cover a significant range of resources, receiving/decoding the scheduling assignments may still fail even if a grant is received/identified correctly. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A DAI (Downlink Assignment Index) may be included in each scheduling assignment, e.g. in addition to a total DAI. The DAI may represent a counter counting the current scheduling assignment. It should be noted that for feedback signalings scheduled or configured for different messages and/or reports and/or transmission timing structures and/or transmission occurrences and/or data blocks or data block structures, different counters/numbers may be used, and/or the counter/number may be reset (e.g., to 0 or 1, depending on convention).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

CBG Code Block Group
CQI Channel Quality Information
CSI Channel State Information
DAI Downlink Assignment Indicator
DCI Downlink Control Information
HARQ Hybrid Automatic Repeat Request
MCS Modulation and Coding Scheme
PUCCH Physical Uplink Control Channel
PUSCH Physical Uplink Shared Channel
RRC Radio Resource Control
SR Scheduling Request UCI Uplink Control Information
CDM Code Division Multiplex
CQI Channel Quality Information
CRC Cyclic Redundancy Check
DCI Downlink Control Information
DFT Discrete Fourier Transform
DM-RS Demodulation Reference Signal
FDM Frequency Division Multiplex
HARQ Hybrid Automatic Repeat Request
OFDM Orthogonal Frequency Division Multiplex
PAPR Peak to Average Power Ratio
PUCCH Physical Uplink Control Channel
PRB Physical Resource Block
RRC Radio Resource Control
UCI Uplink Control Information
UE User Equipment Abbreviations may be considered to follow 3GPP usage if applicable.

The invention claimed is:

1. A method of operating a receiving radio node in a radio access network, the method comprising:
    receiving acknowledgement signaling based on a codebook, the codebook associating a bit pattern comprising at least one subpattern with the acknowledgment signaling, each subpattern representing acknowledgment information according to a reporting type, the codebook grouping subpatterns based on the reporting type, the reporting type indicating a subpattern size and a data block structure to which the at least one subpattern pertains, the reporting type including a first reporting type corresponding to a first data block structure representing a transport block and a second reporting type corresponding to a second data block structure representing at least one code block group of the transport block; and
    the codebook grouping including grouping subpatterns of the bit pattern having the first reporting type into a first group and grouping subpatterns of the bit pattern having the second reporting type into a second group, the first and second groups being arranged sequentially in the bit pattern.

2. A receiving radio node for a radio access network, the receiving radio node being configured for:
    receiving acknowledgement signaling based on a codebook, the codebook associating a bit pattern comprising at least one subpattern with the acknowledgment signaling, each subpattern representing acknowledgment information according to a reporting type, the codebook grouping subpatterns based on the reporting type, the reporting type indicating a subpattern size and a data block structure to which the at least one subpattern pertains, the reporting type including a first reporting type corresponding to a first data block structure representing a transport block and a second reporting type corresponding to a second data block structure representing at least one code block group of the transport block; and
    the codebook grouping including grouping subpatterns of the bit pattern having the first reporting type into a first group and grouping subpatterns of the bit pattern having the second reporting type into a second group, the first and second groups being arranged sequentially in the bit pattern.

3. The receiving radio node according to claim 2, wherein a subpattern pertains to at least one of:
    one acknowledgement signaling process; and
    one component carrier.

4. The receiving radio node according to claim 2, wherein a subpattern comprises at least one bit.

5. The receiving radio node according to claim 2, wherein at least two subpatterns are of different reporting type.

6. The receiving radio node according to claim 2, wherein the codebook is one of configured and configurable.

7. The receiving radio node according to claim 2, wherein a structure of a subpattern represents a mapping of bits representing acknowledgment information to at least one from a group consisting of:
    data blocks;
    at least one subblock group; and
    subblocks of a data block structure.

8. The receiving radio node according to claim 2, wherein grouping the subpatterns comprises grouping the subpatterns according to size.

* * * * *

UNITED STATES PATENT AND TRADEMARK OFFICE
CERTIFICATE OF CORRECTION

| | |
|---|---|
| PATENT NO. | : 11,431,443 B2 |
| APPLICATION NO. | : 16/580907 |
| DATED | : August 30, 2022 |
| INVENTOR(S) | : Baldemair et al. |

It is certified that error appears in the above-identified patent and that said Letters Patent is hereby corrected as shown below:

On the Title Page

On Page 2, in Item (56), under "OTHER PUBLICATIONS", in Column 2, Line 4, delete "Date:Qingdao," and insert -- Date: Qingdao, --, therefor.

On Page 2, in Item (56), under "OTHER PUBLICATIONS", in Column 2, Line 13, delete "Date:Qingdao," and insert -- Date: Qingdao, --, therefor.

On Page 2, in Item (56), under "OTHER PUBLICATIONS", in Column 2, Lines 24-25, delete "Project;Technical" and insert -- Project; Technical --, therefor.

In the Specification

In Column 1, Line 7, delete "2019," and insert -- 2019, now U.S. Pat. No. 10,469,206, --, therefor.

In Column 2, Line 37, delete "and/or or" and insert -- and/or --, therefor.

In Column 2, Line 53, delete "may be" and insert -- may --, therefor.

In Column 2, Line 66, delete "and/or or" and insert -- and/or --, therefor.

In Column 3, Line 22, delete "define" and insert -- defining --, therefor.

In Column 5, Line 3, delete "comprises" and insert -- comprise --, therefor.

In Column 5, Line 10, delete "a feedback)," and insert -- as feedback), --, therefor.

In Column 5, Lines 48-49, delete "Indicator)," and insert -- Index), --, therefor.

In Column 8, Line 51, delete "to by" and insert -- to be --, therefor.

Signed and Sealed this
Twentieth Day of February, 2024

Katherine Kelly Vidal
*Director of the United States Patent and Trademark Office*

CERTIFICATE OF CORRECTION (continued)
U.S. Pat. No. 11,431,443 B2

In Column 11, Line 63, delete "described" and insert -- describe --, therefor.

In Column 12, Line 35, delete "coding (Low Density Parity Check)." and insert -- (Low Density Parity Check) coding. --, therefor.

In Column 12, Line 59, delete "be as" and insert -- be --, therefor.

In Column 13, Lines 45-46, delete "message/s" and insert -- message/s. --, therefor.

In Column 14, Line 21, delete "general" and insert -- generally --, therefor.

In Column 15, Line 40, delete "V2x communication (Vehicular communication)," and insert -- V2X (Vehicle-to-Everything) communication, --, therefor.

In Column 19, Line 20, delete "may be" and insert -- be --, therefor.

In Column 20, Line 8, delete "form or" and insert -- form of --, therefor.

In Column 21, Line 23, delete "of for" and insert -- for --, therefor.

In Column 23, Line 12, delete "controls" and insert -- control --, therefor.

In Column 25, Line 3, delete "CQI Channel Quality Information".